(12) United States Patent
Haartsen

(10) Patent No.: US 6,389,057 B1
(45) Date of Patent: May 14, 2002

(54) ACCESS TECHNIQUE OF CHANNEL HOPPING COMMUNICATIONS SYSTEM

(75) Inventor: Jacobus C. Haartsen, Borne (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/168,604

(22) Filed: Oct. 9, 1998

Related U.S. Application Data

(63) Continuation-in-part of application No. 08/771,692, filed on Dec. 23, 1996, now Pat. No. 5,940,431.

(51) Int. Cl.[7] .......................... H04L 27/30; A61F 2/06; H04Q 7/20
(52) U.S. Cl. ....................................... 375/132; 455/426
(58) Field of Search ........................... 375/132; 455/426

(56) References Cited

U.S. PATENT DOCUMENTS

| | | | |
|---|---|---|---|
| 4,578,816 A | | 3/1986 | Rabain et al. |
| 4,677,617 A | | 6/1987 | O'Connor et al. |
| 5,353,341 A | | 10/1994 | Gillis et al. |
| 5,430,775 A | | 7/1995 | Fulghum et al. |
| 5,432,814 A | | 7/1995 | Hasegawa |
| 5,528,623 A | | 6/1996 | Foster, Jr. |
| 5,734,678 A | * | 3/1998 | Paneth et al. ............ 375/240 |
| 5,778,075 A | * | 7/1998 | Haartsen .................. 380/49 |
| 5,809,417 A | * | 9/1998 | Nealon et al. ........... 455/426 |
| 5,870,673 A | * | 2/1999 | Haartsen .................. 455/426 |
| 5,884,148 A | * | 3/1999 | Bilgic et al. ............. 455/74.1 |
| 5,940,431 A | * | 8/1999 | Haarsten et al. ......... 375/132 |
| 5,978,366 A | * | 11/1999 | Massingill et al. ...... 370/337 |

FOREIGN PATENT DOCUMENTS

| | | |
|---|---|---|
| EP | 0082054 A1 | 6/1983 |
| WO | WO96/08941 | 3/1996 |
| WO | WO98/28926 | 7/1998 |

* cited by examiner

*Primary Examiner*—Chi Pham
*Assistant Examiner*—Tony Al-Beshrawi
(74) *Attorney, Agent, or Firm*—Burns, Doane, Swecker & Mathis, L.L.P.

(57) ABSTRACT

Establishing a connection between a paging unit and a standby unit in a channel hopping communications system includes activating the standby unit for an activation time period out of every standby time period. During each activation time period, the standby unit monitors a selected channel for receipt of a paging message. The selected channel is selected from a plurality of channels, and, for each subsequent activation time period, the selected channel is a subsequent one of the plurality of channels as specified by a hopping sequence and an internal clock. A page train is repeatedly transmitted from the paging unit to the standby unit, until a response is received from the standby unit. Each page train includes a plurality of paging messages, each paging message being transmitted on a different one of a subset of the plurality of channels. Selection of a page train for transmission by the paging unit may be based on an estimate of the standby unit's internal clock. The generation of page trains can be further optimized for those cases in which more than two page trains will be transmitted. The purpose of the optimization is to generate page trains that, when transmitted, are most likely to elicit an early response from the paged unit.

22 Claims, 14 Drawing Sheets

FIG. 15a  M EVEN, i EVEN OR ODD $-iM/2-M/2$ ... $-iM/2-1$ | $iM/2$ | $iM/2+1$ ... $iM/2+M/2-1$

FIG. 15b  M ODD, i EVEN $-iM/2-(M-1)/2$ ... $-iM/2-1$ | $iM/2$ | $iM/2+1$ ... $iM/2+(M-1)/2$

FIG. 15c  M ODD, i ODD $-iM/2-1/2-(M-1)/2$ ... $-iM/2-3/2$ | $-iM/2-1/2$ | $iM/2-1/2+1$ ... $iM/2-1/2+(M-1)/2$

ACCESS TECHNIQUE OF CHANNEL HOPPING COMMUNICATIONS SYSTEM

CROSS-REFERENCE TO COPENDING APPLICATION

This is a continuation-in-part of Application Ser. No. 08/771,692, filed Dec. 23, 1996, now U.S. Pat. No. 5,940,431.

BACKGROUND

The present invention relates to communications systems applying slow frequency hopping, and more particularly to a procedure for synchronizing two frequency hopping units to each other in order to establish a communication link.

Frequency hop (FH) spreading has been an attractive communications form in military applications for a long time. By sending signals sequentially in different parts of the radio spectrum in a pseudo-random way, both high security against eavesdropping, and immunity against narrowband interferers is obtained. With the advent of fast, cheap, and low-power synthesizers, FH transceivers are becoming commercially attractive, and are used more and more in civil applications as well. For certain wireless radio systems, FH is especially attractive because of its immunity to unknown interference and to Rayleigh fading. Examples are radio systems using unlicenced bands like the Industrial, Scientific and Medical (ISM) bands at 900, 2400 and 5700 MHZ. Because the radio communications are unregulated in these bands (apart from some transmission power restrictions), communication systems using this band must be capable of sustaining any (i.e., a priori unknown) interference. FH appears to be an attractive tool in fighting the interference.

Two types of FH systems can be distinguished: slow FH and fast FH. In slow-FH communications, a burst of symbols is transmitted in a hop. So the symbol rate is higher than the hop rate. In fast-FH, a single symbol is spread over several hops, so that the hop rate is higher than the symbol rate. Fast-FH puts high requirements on the speed of the transceiver electronics, especially at higher symbol rates. Therefore fast-FH is not attractive for portable usage because of higher power consumption. Slow-FH provides all the system features required in a wireless communications system, that is, interference immunity and fading immunity.

For a FH connection to operate, synchronization between the two hopping transceivers is required: the transmission (TX) hop of one unit must be the receive (RX) hop of the other unit, and vice versa. Once the two units are locked, they just use the same hop sequence at the proper rate in order to maintain the connection. However, a problem is to get the two units synchronized initially. When there is no connection, a portable unit is usually in a standby mode. In this mode, it sleeps most of the time, but periodically it wakes up to listen for paging messages from units that want to connect. A problem with a FH scheme is that the paging unit does not know when and on what hop channel the unit in standby will listen for paging messages. This results in an uncertainty both in time and in frequency.

Conventional techniques have attempted to solve the problem of establishing a connection between a paging unit and a unit in standby mode. In U.S. Pat. No. 5,353,341 issued to Gillis, a single reserved hop channel is used for access. The paging unit always sends paging messages out on this single reserved channel, and when the standby unit periodically wakes up, it only monitors the one reserved channel. Because there is no hopping of the access channel, there is no frequency uncertainty. However, this strategy has the drawback of lacking the benefits that an FH strategy can provide: When the reserved channel is disturbed by a jammer, no access can take place.

U.S. Pat. No. 5,430,775 to Fulghum et al. discloses a system in which reserved channels are used as agreed upon by sender and recipient. In this case, there are two reserved channels: one to "reserve" the access channel, and the other is the access channel itself. The access process lacks the benefits that FH can provide because both the reservation and the access channel do not hop, but are instead constant.

U.S. Pat. No. 5,528,623 to Foster, Jr. discloses a system in which both the sender and the recipient hop in the access procedure, thereby providing the fall benefits of a FH scheme. However, in this system the recipient is required to hop quickly during the wake-up period, while the paging unit hops slowly. As a result, this system has the undesirable effect of requiring the recipient (i.e., the unit in standby) to expend a relatively large amount of power during every wake-up period, just to check to see whether it is being paged. Another apparent shortcoming of the system as described by Foster, Jr. is that there is no explanation of how the return message from the recipient to the sender is arranged. That is, a 3.3 ms return period is defined in which the sender listens for a response; but upon receipt of the page message, the recipient does not know when this 3.3 ms listening period starts.

SUMMARY

It is therefore an object of the present invention to provide an access method for units applying a FH scheme which allows the standby unit to have a low duty cycle on the sleep/wake-up period thus providing a low-power standby mode, but at the same time limits the access delay in setting up a connection.

The foregoing and other objects are achieved in apparatuses and methods for establishing a connection between a paging unit and a standby unit in a channel hopping communications system. In accordance with one aspect of the invention, the standby unit is activated for an activation time period, $T_{wake}$, out of every standby time period, $T_{standby}$. During each activation time period, the standby unit is caused to monitor a selected channel for receipt of a paging message, wherein the selected channel is selected from a plurality of channels, and wherein, for each subsequent activation time period, the selected channel is a subsequent one of the plurality of channels as specified by a hopping sequence. During a first repetition period, a first page train is repeatedly transmitted from the paging unit to the standby unit, until a response is received from the standby unit. If the response is not received from the standby unit during the first repetition period, then during each of one or more subsequent repetition periods, a corresponding one of one or more subsequent page trains is repeatedly transmitted from the paging unit to the standby unit until the response is received from the standby unit. In the above technique, each of the first and subsequent page trains comprises a plurality of paging messages, each paging message being transmitted on a different one of a subset of the plurality of channels. The first page train is transmitted on a subset of channels that are selected from the hopping sequence, wherein the selected channels include a hop frequency associated with an expected wake-frequency and one or more different hop frequencies that are nearest the expected wake-frequency in the hopping sequence, and wherein non-selected channels in the hopping sequence constitute one or more remaining portions of the hopping sequence. Each of the one or more subsequent page trains is transmitted on a respectively different subset of channels that are selected from those channels that are nearest the expected wake-frequency in successively remaining portions of the hopping sequence.

In one aspect of the invention, the repetition period may be substantially equal to the standby period. In alternative embodiments, the repetition period may be greater than or equal to the standby period.

In another aspect of the invention, each page train is transmitted on a subset of channels that are selected from the plurality of channels in accordance with the following equation:

$$\text{train } i = \{hop_{modN}(k_s'-(i+1)M/2), hop_{modN}(k_s'-(i+1)M/2+1), \ldots, hop_{modN}(k_s'-iM/2-1)$$

$$hop_{modN}(k_s'+iM/2), hop_{modN}(k_s'+iM/2+1), \ldots, hop_{modN}(k_s'+(i+1)M/2-1)\}$$

where $k_s'$ is an estimate of a clock value of the standby unit, the standby unit's clock value being updated every $T_{standby}$ period, N is the number of channels in the hopping sequence, $T_{page}$ is the duration of a page message, $M=INT(T_{wake}/T_{page})-1$, where $INT(\ )$ is a function that leaves only the integer part of a variable, the number of page trains, $N_T$, is given by $N_T$=RNDUP (N/M), where RNDUP( ) is a function that rounds any non-integer up to the nearest integer, $i=0, \ldots, (N_T-1)$, and $hop_{modN}(x)=hop(x \bmod N)$. This technique for selecting page train channels is especially useful when M is an even number.

In an alternative embodiment, each page train is transmitted on a subset of channels that are selected from the plurality of channels in accordance with the following equations:

$$\text{train } i = \{hop_{modN}(k_s'-iM/2-(M-1)/2), \ldots, hop_{modN}(k_s'-iM/2-1), hop_{modN}(k_s'+iM/2), hop_{modN}(k_s'+iM/2+1), \ldots, hop_{modN}(k_s'+iM/2+(M-1)/2)\}$$

when i is an even number within the range 1 . . . EVEN($N_T-1$); and $$\text{train } i = \{hop_{modN}(k_s'-iM/2-1/2-(M-1)/2), \ldots, hop_{modN}(k_s'-iM/2-3/2), hop_{modN}(k_s'-iM/2-1/2), hop_{modN}(k_s'+iM/2-1/2+1), \ldots, hop_{modN}(k_s'+iM/2-1/2+(M-1)/2)\}$$

when i is an odd number within the range 1 . . . ODD ($N_T-1$), wherein:

EVEN(x) represents a first function that returns x when x is even, and returns a value x−1 when x is odd;

ODD(x) represents a second function that returns x when x is odd, and returns a value x−1 when x is even;

$k_s'$ is an estimate of a clock value of the standby unit, the standby unit's clock value being updated every $T_{standby}$ period;

N is the number of channels in the hopping sequence;

$T_{page}$ is the duration of a page message;

$M=INT(T_{wake}/T_{page})-1$, where $INT(\ )$ is a function that leaves only the integer part of a variable;

the number of page trains, $N_T$, is given by $N_T$=RNDUP (N/M), where RNDUP( ) is a function that rounds any non-integer up to the nearest integer;

and $hop_{modN}(x)=hop(x \bmod N)$. This technique for selecting page train channels is especially useful when M is an odd number.

For any of the above embodiments, and in another aspect of the invention, the estimate of the standby unit's clock may be determined from a present clock value of a paging unit clock, adjusted by a previously determined offset between standby unit and paging unit clock values.

In yet another aspect of the invention, for any of the above embodiments, the previously determined offset may be stored in a non-volatile memory for future access attempts.

In still another aspect of the invention, the channel hopping communications system may be a frequency hopping communications system. In alternative embodiments, the channel hopping communications system may be a code hopping communications system.

BRIEF DESCRIPTION OF THE DRAWINGS

The objects and advantages of the invention will be understood by reading the following detailed description in conjunction with the drawings in which:

FIG. 15a,–15c are diagrams illustrating a generalized page train.

DETAILED DESCRIPTION

Figure 1:
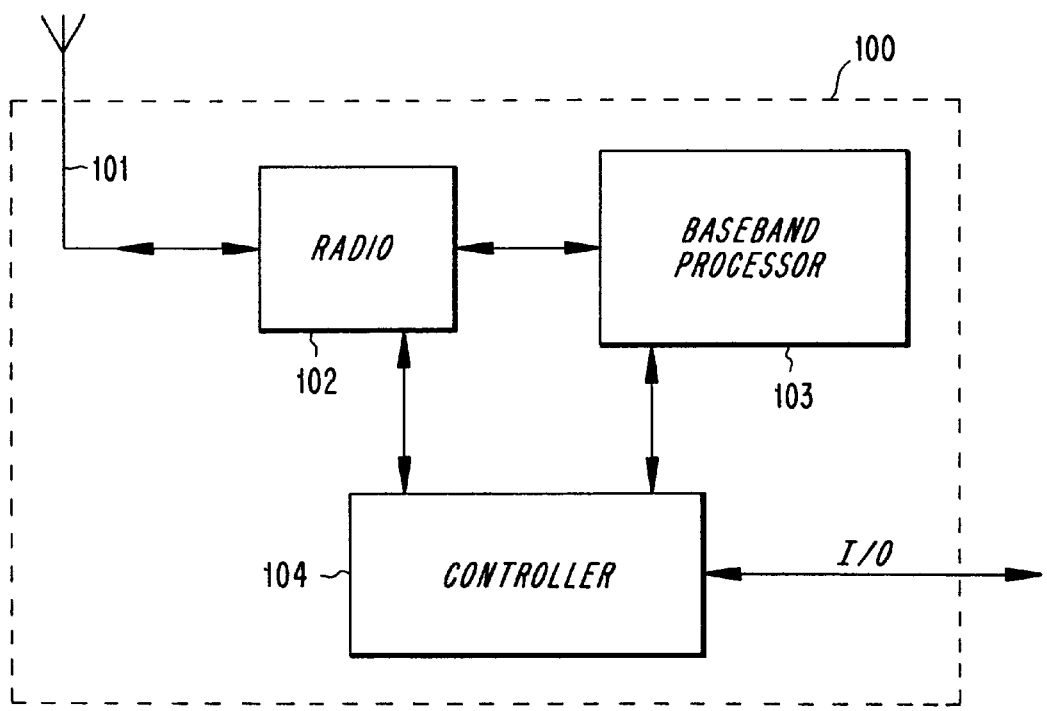
FIG. 1 is a block diagram of a frequency-hopping transceiver in accordance with the invention.

The various features of the invention will now be described with respect to the figures, in which like parts are identified with the same reference characters.

The invention proposes an access procedure in which minimal activity is required in the unit in standby mode, thus resulting in low-power standby mode. The unit that is trying to get access has to resolve the time uncertainty problem. This is achieved by repeatedly transmitting paging messages at different channel hops (e.g., frequency hops) until reception is acknowledged by the recipient. The search by the paging unit can be reduced considerably by estimating the wake-up time and wake-up hop of the standby unit. A unit in standby wakes up at regular intervals in hop channels defined by a pseudo-random wake-up sequence. A free-running clock in the unit determines when and on what hop channel in the wake-up sequence the unit wakes up to monitor for paging messages. If the paging unit can estimate the recipient's clock, it can estimate when and on which hop it wakes up, thus reducing the access delay.

The accuracy of the clock estimate depends on the relative drift of the clocks in the two units, and on the time elapsed since the two units exchanged their internal clock values during a connection. The larger the drift and the longer the elapsed time, the larger the uncertainty in time and frequency, and the longer the search process will take. In the proposed system, the clocks are free running and never adjusted. Only clock offsets are used in the estimation process. In this way, a unit will have a list of clock offsets with respect to a number of other units that it has been connected to in the past.

Figure 2B:
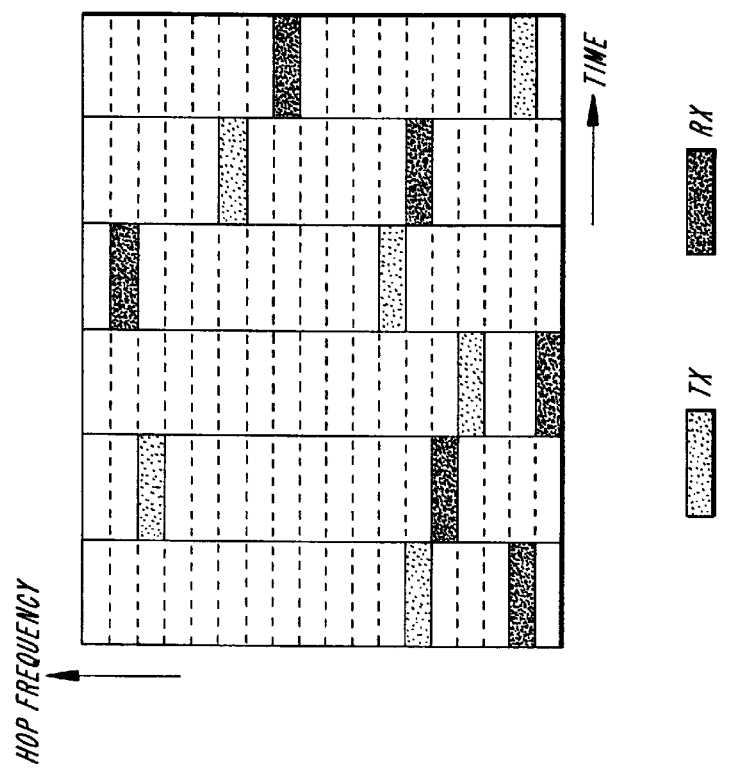
FIGS. 2a and 2b illustrate prior art examples of duplex FH links utilizing time division duplex and frequency division duplex, respectively.
Figure 2A:
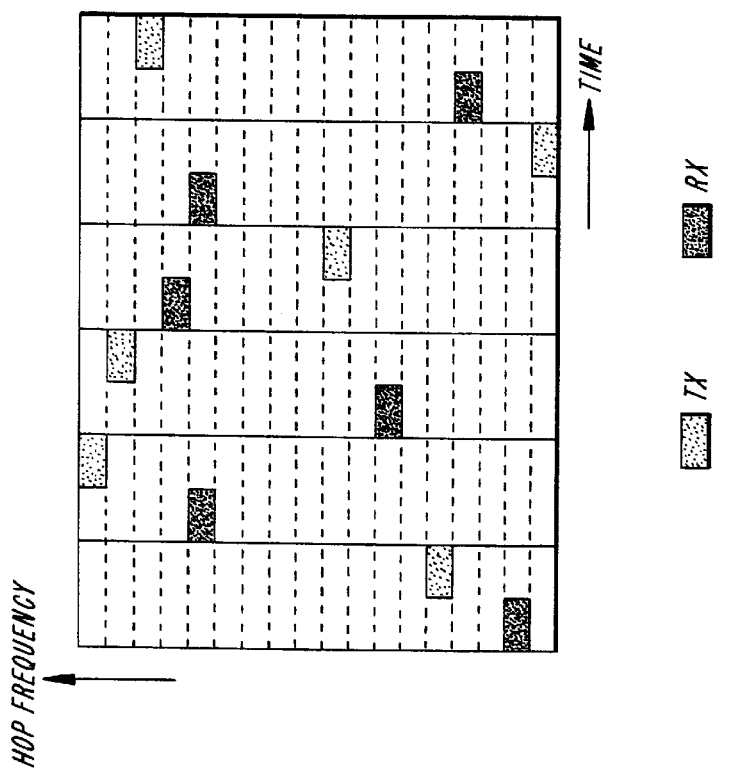

To facilitate an understanding of the invention, a slow-FH communication system will be considered. An example of a frequency-hopping (FH) transceiver 100 in accordance with the invention is shown in FIG. 1. The transceiver 100 includes an antenna 101, a radio 102, a baseband processor 103, and a controller 104. The baseband processor 103 provides frames of information bits to the radio 102. The radio 102 then modulates and upconverts the modulated signal to the proper hop frequency, and transmits the signal via the antenna 101. The radio 102 transmits the TX frames in different hop frequencies according to a pseudo-random FH sequence. In case of a full-duplex link, RX frames are either received in between the TX frames in the case of a time-division duplex (TDD) link, or else they are received simultaneously with the transmission of the TX frame in the case of a frequency-division duplex (FDD) link. In case of FDD, the TX hop and RX hop cannot be identical. Examples of duplex FH links utilizing TDD and FDD, respectively, are shown in FIGS. 2a and 2b. The controller 104 controls the components of the transceiver 100 in accordance with the principles fully described below.

Figure 3:
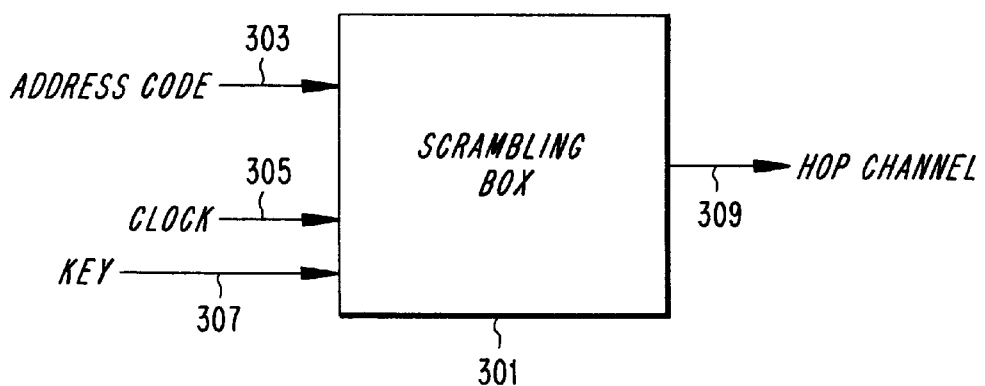
FIG. 3 is a block diagram of conventional means for performing hop selection.

To minimize interference between transceivers supporting different links, each link applies a unique hop sequence. The cross correlation between different hop sequences should be small in order to minimize collisions of frames of different links. Error correction protocols to overcome collisions should be implemented in higher-layer link protocols. In an exemplary system, each transceiver has a unique address code and a free-running clock. The address code can be considered as the user address. The address code selects the FH sequence that will be used, the clock determines the phase in the sequence, that is, which particular hop of the sequence is selected at a specific time. An embodiment of conventional means for performing hop selection is shown in FIG. 3. This figure shows a scrambling box 301 in which a hop channel is derived from the supplied clock 305, an address code 303, and (optionally) a unique (encryption) key ($K_e$) 307 in a pseudo-random way. Each time the clock 305 is updated, a new hop channel 309 is selected according to the pseudo-random algorithm implemented in the scrambling box.

Two units that are connected will use the same address code, the same clock and, if present, the same key, $K_e$, for the duration of the connection. Once connected, a mechanism must be applied to keep the two clocks synchronized. This can, for example, be achieved by synchronization bit-sequences in the frame headers that indicate an early or late reception, which can then be used to slow down or speed up the clock rate, respectively. If a leaky mechanism in the clock update is applied, the two units will be loosely coupled at an intermediate clock rate.

The problem with FH systems lies in the initial synchronization of the two transceivers. A transceiver in portable applications usually resides in a standby mode when no connection is present. In this mode, the transceiver should perform very little activity in order to minimize the power consumption. The only procedure to be carried out in the standby mode is to monitor the radio channels for paging messages at regular intervals. To save power consumption, it is desirable for standby mode to have the following characteristics:

1) The duty cycle for wake-up interval/sleep interval should be low (say 1%), so that most of the time the standby unit does not perform any activity at all, but instead merely sleeps.

2) During the wake-up interval $T_{wake}$, the unit should engage only in monitoring activity, and should not transmit any signals.

3) During the wake-up interval $T_{wake}$, the unit should wake up on a single hop frequency only.

4) Each new wake-up time, the unit should wake up in a different hop frequency according to a pseudo-random hop sequence.

Figure 4:
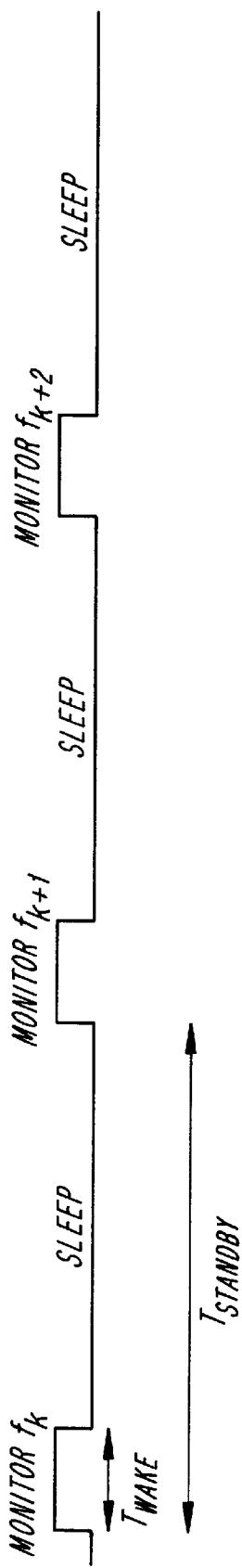
FIG. 4 is a timing diagram of a transceiver's standby activity, in accordance with one aspect of the invention.

An example of the transceiver's standby activity in accordance with one aspect of the invention is shown in FIG. 4. Every $T_{standby}$ seconds, the receiver section of the radio 102 in the unit wakes up and monitors on a single hop frequency $f_k$ for $T_{wake}$ seconds. The selected hop frequency is determined by the user address, the unit's clock value, k, and (optionally) a unique (encryption) key ($K_e$). The standby clock is updated every $T_{standby}$ seconds; therefore, at each new wake-up instance, a new hop frequency is monitored.

Another unit seeking contact (i.e., a paging unit) has to reach the unit in standby with its paging message. The paging unit does not know when the unit in standby mode will wake up or in what hop frequency it will wake up. Consequently, the paging unit has to resolve the time/frequency uncertainty. This will require quite some effort (=power consumption) from the paging unit, but since paging only happens once in a while, compared to the standby mode, which can last forever, putting most of the activity for a call setup in the paging process and not in the standby process is preferred.

The call-setup delay is determined by the amount of uncertainty in time and frequency. In order to reduce the delay, the uncertainty must be restricted. In accordance with a first aspect of the invention, this is achieved by using a hop sequence in the standby mode of finite length N, say S={$f_1$, $f_2 \ldots f_N$}, where $f_k$ is a hop channel. The receiver applies the hops in a sequential manner: each time the clock is incremented, the next hop in the sequence is selected. After $f_N$, the unit starts with $f_1$ again, and so on. Thus, the clock only has to count modulo N. The smaller N is, the smaller the frequency uncertainty is, but the less interference immunity is obtained. To minimize the uncertainty in time, it is preferred that all hop frequencies in the sequence be unique, that is $f_k=f_m$ if and only if k=m. This means that if the two units happen to land on the same hop frequency, they will be automatically synchronized, provided the same hop sequence and same hop rate are applied thereafter.

Figure 5:
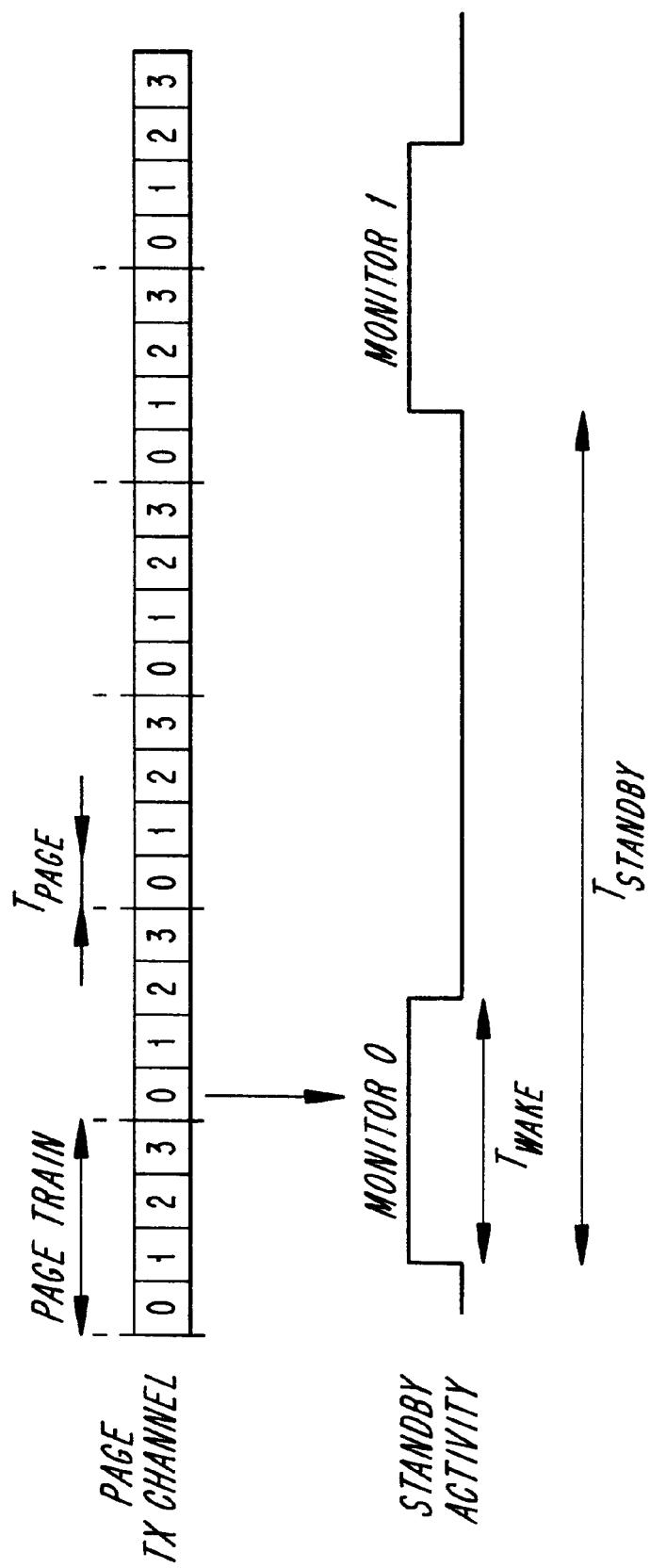
FIG. 5 is a timing diagram that illustrates the repeated transmission of a page train, in accordance with one aspect of the invention.

The hop sequence S is determined by the user address of the standby unit, so the paging unit will use this same address in order to apply the same hop sequence as the standby unit. If we assume that the standby unit's clock is unknown to the paging unit, the paging unit does not know when the standby unit will wake up and what phase it will be using in the sequence S. The best it can do is to transmit paging messages on as many different hop frequencies as possible during a wake-up period, $T_{wake}$. Suppose the duration of a page message is $T_{page}$. In this case, the paging unit can send $INT(T_{wake}/T_{page})$ page messages at different hop frequencies, where INT( ) is a function that leaves only the integer part of an input variable. In order to assure that each page message falls at least once completely in the wake-up period, the number of hops, M, in a so-called page train is preferably $M=INT(T_{wake}/T_{page})-1$. A page train is defined as a block of page messages, each page message being transmitted at a different hop frequency. The page messages in a page train are preferably identical to one another. Since the time of wake up is unknown to the paging unit, it should repeatedly transmit a page train until it receives a response from the other unit. An example of this aspect of the invention is shown in FIG. 5. In this example, a page train of length M equal to 4 is shown. In each hop, a page message (not shown) is transmitted which includes the recipient's unique address. If the hop sequence is also of length N=4, then the paging unit reaches the standby unit at least within the standby period $T_{standby}$.

To satisfy both the low duty cycle in standby mode and the interference immunity in general, it is usually the case that N>M. This means that, unlike the previous example, the entire hop sequence cannot be covered with a single page train. Therefore, more than one page train is needed. To this end, a number of page trains are defined that, when taken together, cover the entire hop sequence. Since the paging unit does not know when the standby unit will wake up, changes from one transmitted page train to another should not be made any more frequently than once every repetition period $T_{repeat}$. The repetition period $T_{repeat}$ may be greater than or equal to the standby period, $T_{standby}$, and is preferably substantially equal to the standby period $T_{standby}$. This will ensure that each page train at least overlaps a wake-up period. If no response is received after a time period $T_{repeat}$, the paging unit can then switch to another page train.

Figure 6:
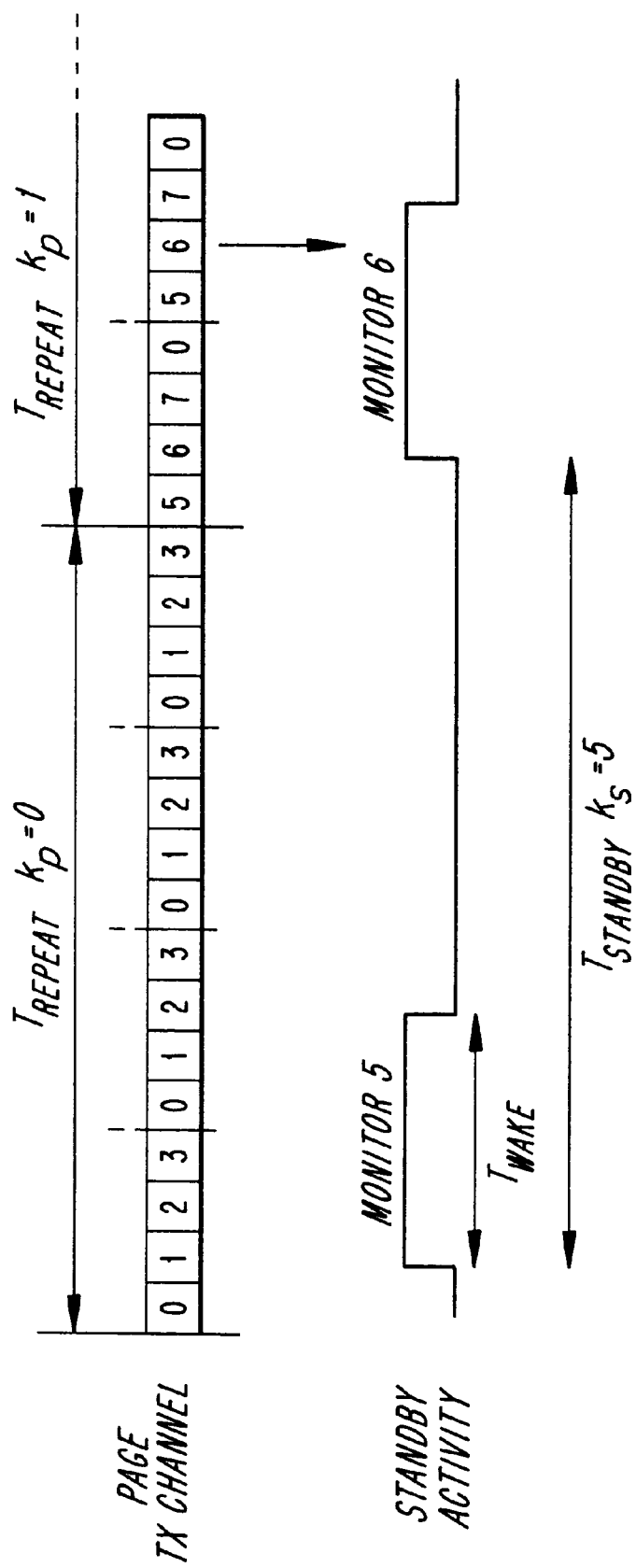
FIG. 6 is a timing diagram that illustrates the transmission of different page trains during different repetition periods, in accordance with one aspect of the invention.
Figure 7:
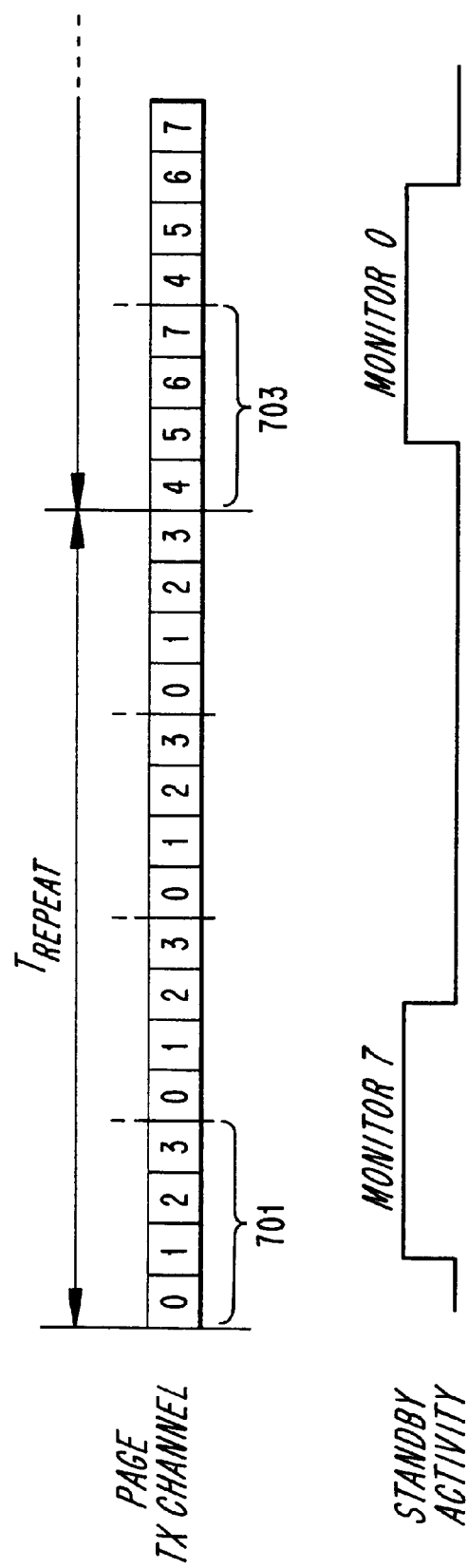
FIG. 7 is a timing diagram that illustrates inefficiencies that can be caused by non-optimized selection of page trains for transmission during different repetition periods.

FIG. 6 shows an example of this aspect of the invention with M=4 and N=8. The total hop sequence comprises hops 0 through 7. The first page train comprises hops 0 through 3, while the second page train comprises hops 0 and 5 through 7. In the illustrated example, the page message arrives at the standby unit during the second wake-up period ($k_p=1$) at hop channel 6. During the first period, $k_p=0$, the paging unit uses a page train with the first four hop channels. However, notice that in the second period, $k_p=1$, hop channels {5,6,7,0} are chosen instead of the four remaining hop channels {4,5,6,7}. This is because the paging unit has to anticipate that the standby unit will update its clock every $T_{standby}$ seconds. Failure to do this can result in the type of inefficiency illustrated in FIG. 7. In the example, the first page train 701 does not contain hop channel 7 and therefore a second attempt with a second page train 703 is tried after a period, $T_{repeat}$ (which is at least substantially equal to $T_{standby}$). In this second page train 703, the remaining hop channels are used, namely {4,5,6,7}. As shown, the second attempt also fails because the standby unit has stepped its clock forward as well, so that hop channel 0 is being monitored. It is not until the following monitor period that a response will be received when the paging unit again uses the first page train 701 and the standby unit monitors hop channel 1.

In the considered case of FIG. 6 with M=4 and N=8, the paging unit uses two page trains, namely $$\text{train } A=\{hop_{mod8}(k_p), hop_{mod8}(k_p+1), hop_{mod8}(k_p+2), hop_{mod8}(k_p+3)\}$$

and $$\text{train } B=\{hop_{mod8}(k_p+4), hop_{mod8}(k_p+5), hop_{mod8}(k_p+6), hop_{mod8}(k_p+7)\}$$

where $k_p$ is the paging unit's clock value which is incremented every $T_{standby}$, and $hop_{modN}(x)=hop(x \bmod N)$, so that the hop sequence is used in a circular manner.

It will be understood that when N>2M, more than two page trains must be used. These page trains should be applied sequentially, each for a duration of $T_{repeat}$. In general, the number of required page trains is given by $N_T=RNDUP(N/M)$, where RNDUP( ) is a function that rounds any non-integer up to the nearest integer.

For this general case, the page trains may be specified by the following equation:

$$\text{train } i=\{hop_{modN}(k_p+iM), hop_{modN}(k_p+iM+1), \ldots, hop_{modN}(k_p+iM+(M-1))\}$$

where $i=0, \ldots, (N_T-1)$.

Figure 8:
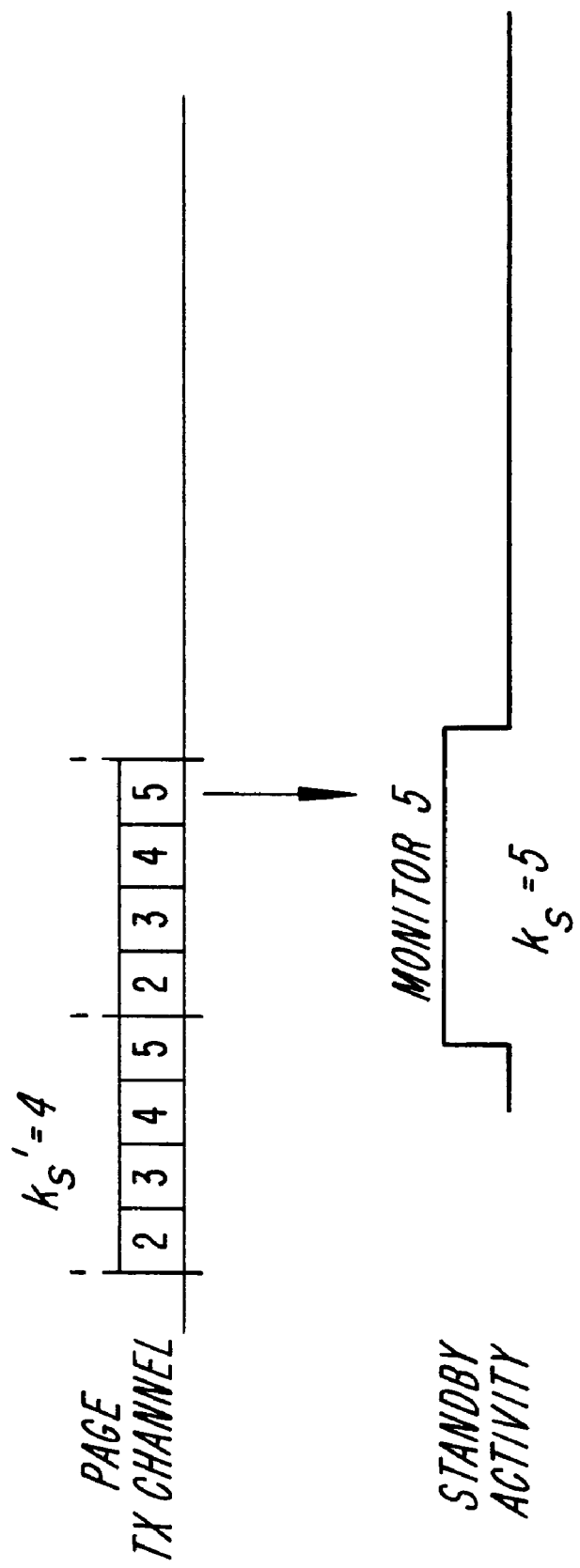
FIG. 8 is a timing diagram that illustrates the transmission of different page trains based on estimates of the standby unit's clock, in accordance with one aspect of the invention.

If errors on the channels are ignored, the above strategy assures page reception within a maximum delay of $N_T * T_{repeat}$ seconds. This delay can be reduced when there is a way to estimate the value of the clock $k_s$ of the standby unit. If the standby clock is approximately known, the proper page train can be selected that covers the expected wake-up hop, as well as the hops just before and after the expected wake-up hop in order to allow for estimate errors. In the example of FIG. 6, the following page trains can be used:

$$\text{train } A=\{hop_{mod8}(k_s'-2), hop_{mod8}(k_s'-1), hop_{mod8}(k_s'), hop_{mod8}(k_s'+1)\}$$

and $$\text{train } B=\{hop_{mod8}(k_s'+2), hop_{mod8}(k_s'+3), hop_{mod8}(k_s'+4), hop_{mod8}(k_s'+5)\}$$

where $k_s'$ is the estimate of the standby clock in the paging unit. To illustrate the operation of this aspect of the invention, suppose the actual value of the standby clock is $k_s=5$, and that the estimate of the standby clock is $k_s'=4$. In this case, the first page train would look like the one in FIG. 8. Although the estimate was in error by one second, a fast access is still accomplished.

The above example is for the specific case where M=4 and N=8. In general, the page trains may be specified by the following equation:

$$\text{train } i=\{hop_{modN}(k_s'-\alpha+iM), hop_{modN}(k_s'-\alpha+iM+1), \ldots, hop_{modN}(k_s'-\alpha+iM+(M-1))\}$$

where
  $i=0, \ldots, (N_T-1)$;
  and where $\alpha$ is a fixed offset value larger than zero. This offset, $\alpha$, is chosen such that train A contains hops leading and following the estimate hop, $hop_{modN}(k_s')$ in order to account for positive and negative errors in the clock estimate $k_s'$, respectively.

The estimate of the standby clock value may be derived from information obtained in a previous connection. That is, when two units are connected, they exchange some parameters including the clock values in both units. Each unit compares the other unit's clock value to its own in order to determine a clock offset value which can thereafter be added to its own clock value in order to estimate the present clock value in the other unit. During the connection, the clocks remain synchronized by a loose locking mechanism. For example, each unit may check its received signal timing with respect to its transmitted signal timing on early/late arrival, and adjust its clock accordingly. If the algorithm is leaky (i.e., the early/late compensation is not exact), both units will stabilize at an intermediate clock rate, somewhere between the clock rates of the individual units.

Once the connection is broken, the units retain the clock offset value which had been determined during the connection. Due to relative drift of each unit's clock, the clock estimates (i.e., the units' respective estimates of the other's clock as determined by the sum of its own clock value added to the retained clock offset value) become unreliable. For each unit, the uncertainty in the estimated clock value of the other unit depends on the amount of time that has elapsed since the disconnection and the rate of drift. For example, suppose the units have a relative drift of X parts per million (ppm). Then after a period of 1/X seconds, a unit's estimate of the other unit's clock value is still accurate within a second, and with the above-described technique, the access procedure would be as fast as when an exact replica of the internal clock in the standby unit had been known. It is stressed that the clock estimate $k_s'$ does not replace the existing clock value, $k_p$, in the paging unit's clock. Rather, the paging unit merely determines an offset value, $\Delta$, based on the difference between its own clock value and that of the other unit at the time the connection was established. The offset value, $\Delta$, is then added to the present value of the paging clock $k_p$ to give a present estimate of the other unit's clock value: $k_s'=k_p+\Delta$.

A unit preferably stores a complete list of relative estimates, $\Delta_i$, for each of the units that it has been connected with in the past. Prior to initialization, it checks the list to see whether there is an estimate $\Delta_i$ for the standby unit to be paged. If so, the paging unit uses an estimated clock value, $k_s'=k_p+\Delta_i$, to page the considered standby unit.

It will be apparent that the access delay during initial call setup depends on:

1) the number of hop channels covered in a single train;
2) the number of hop channels in the hopping sequence;
3) the amount of relative clock drift; and
4) the elapsed time since disconnection.

Together with the wake-up duration $T_{wake}$ and the standby period $T_{standby}$, the system can be optimized for short access delay and low-power consumption in standby mode.

Once a connection has been established, the paging unit keeps the clock phase at that phase for which the access succeeded. From that moment on, the connection clock rate at both units can be set to hop through the spectrum at a higher rate than the standby unit had been using. In addition, the units can also decide on a different (possibly longer) FH sequence to continue the connection with. This might be desirable if the paging hop pattern is less than ideal for maintaining the connection.

Figure 9:
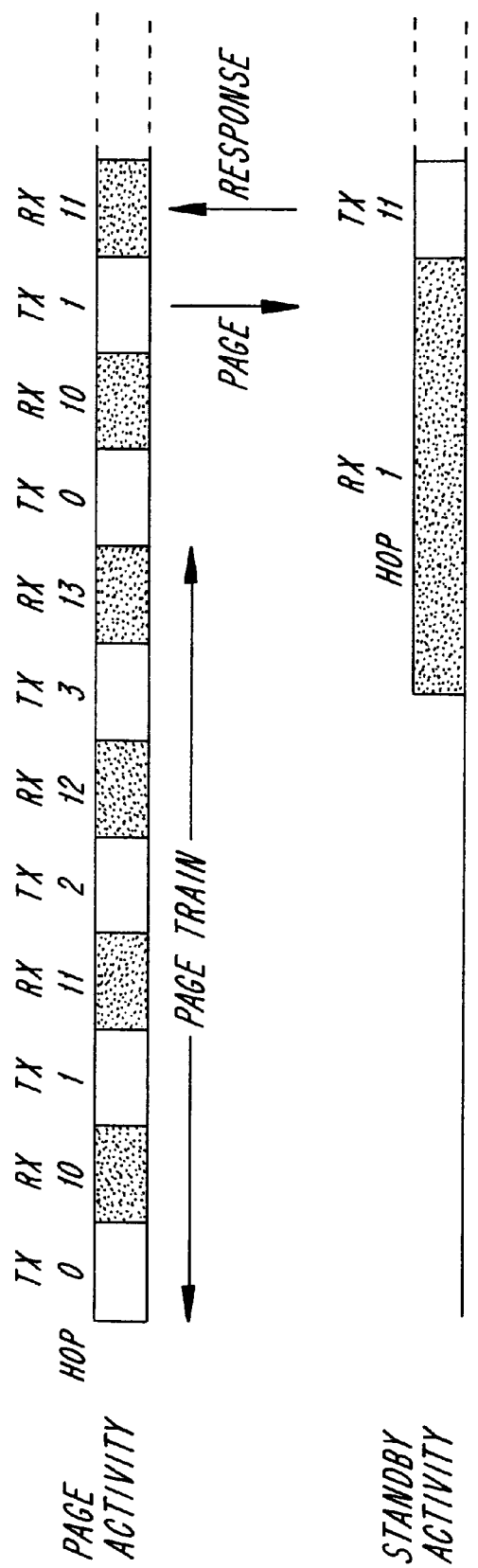
FIG. 9 is an embodiment of a response procedure in a time division duplex scheme, in accordance with the invention.
Figure 10:
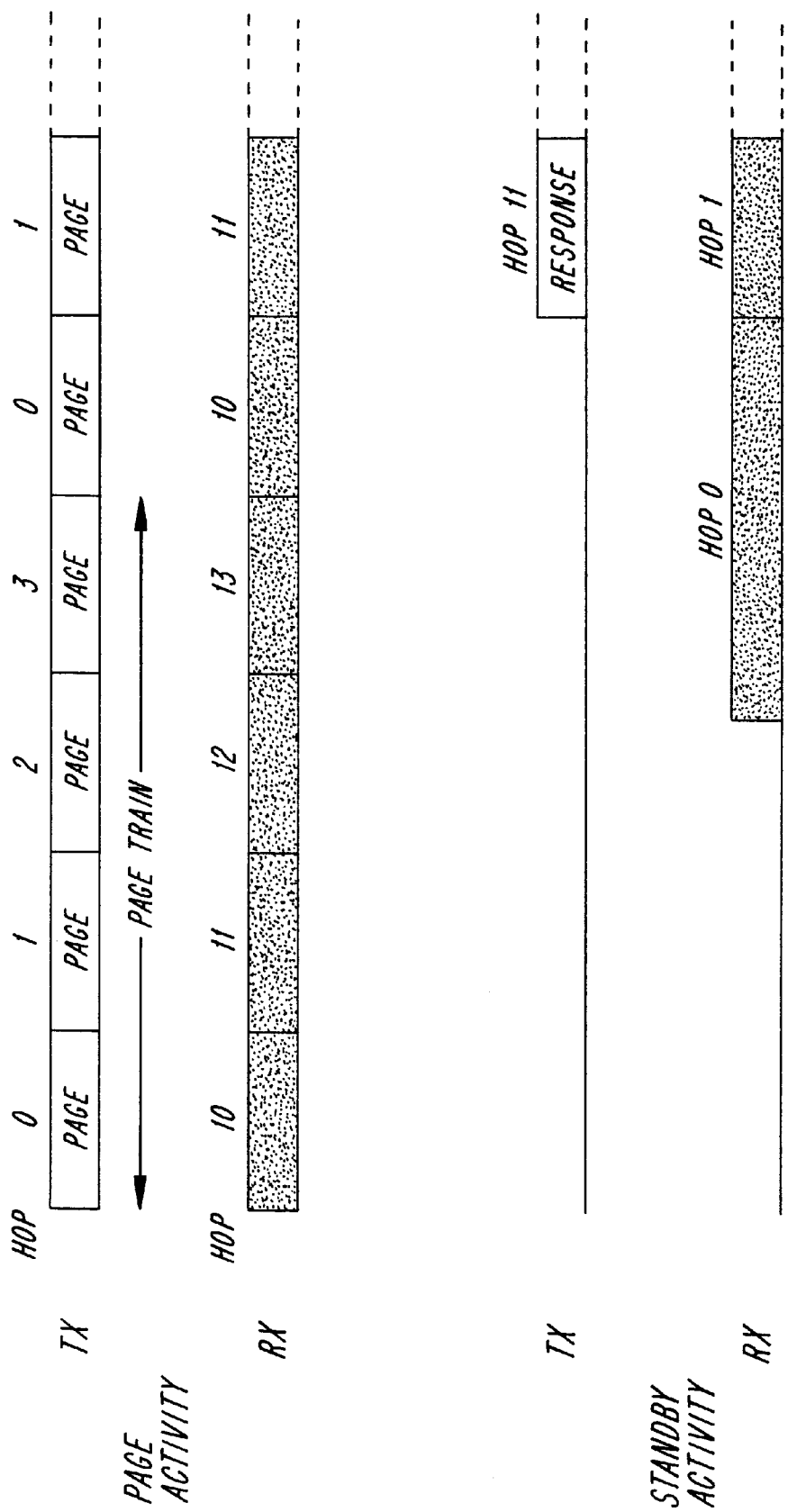
FIG. 10 is an embodiment of a response procedure in a frequency division duplex scheme, in accordance with the invention.
Figure 11:
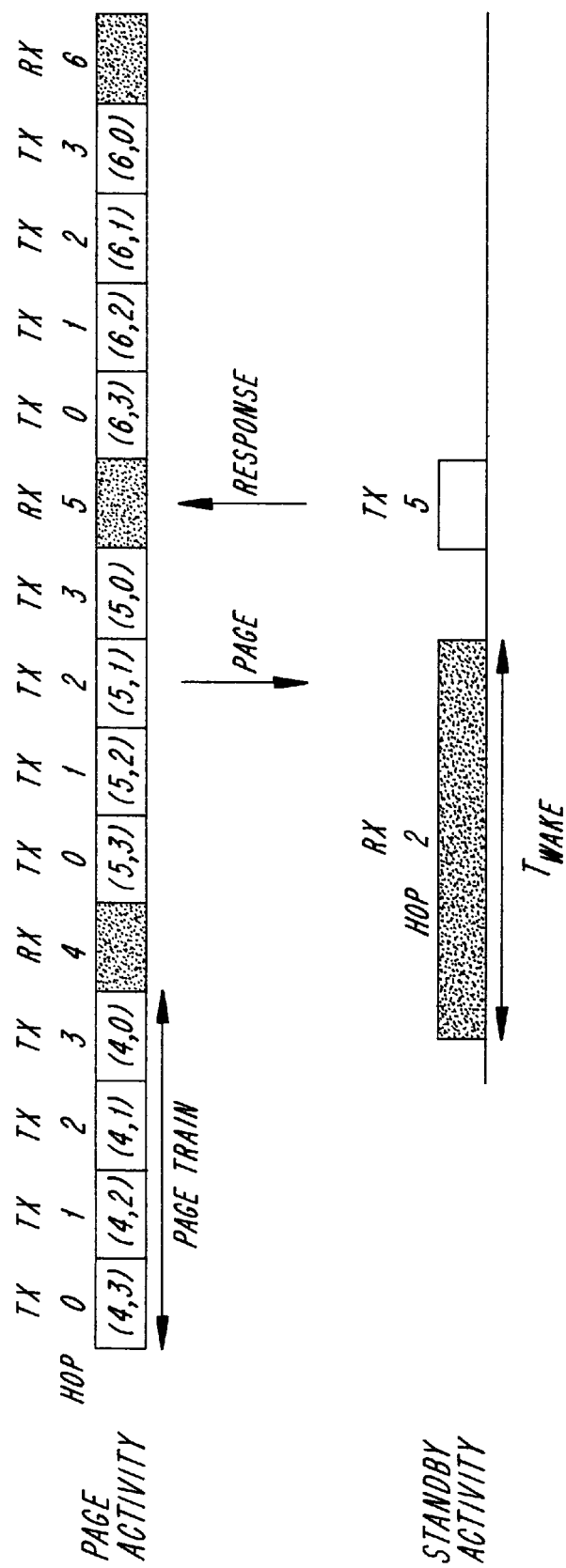
FIG. 11 is an alternative embodiment of a response procedure in accordance with the invention.
Figure 12:
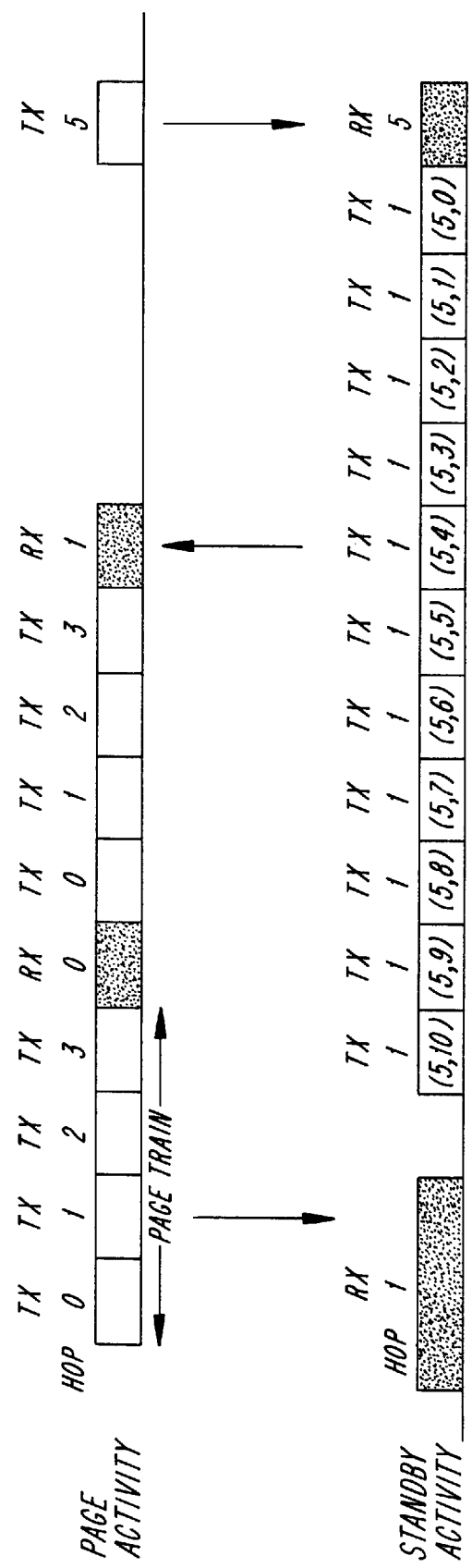
FIG. 12 is another alternative embodiment of a response procedure in accordance with the invention.

In the description above, only the communication from the paging unit to the standby unit was considered. In another aspect of the invention, the response of the standby unit to the paging unit can be accomplished in a number of ways. A response hop sequence S' can be defined in, which the hops have a one-to-one correspondence with the hops in the page hop sequence, S. In case of a TDD scheme, the paging unit monitors the response hop $f'_k$ in S' just after it has transmitted a page message on hop $f_k$ in S, as illustrated in FIG. 9. In this example, the response sequence S' is derived from the page sequence S by adding a constant 10. The page message received in the standby unit in hop 1 is therefore acknowledged in hop 11. In case of FDD, it would transmit in hop $f_k$ and monitor in hop $f'_k$ simultaneously, as illustrated in FIG. 10. However, other response procedures are possible as well. For example, the paging units may monitor for response messages less frequently. In that case, the paging unit must indicate in its page message when it will listen, or a method must be used in which the standby unit repeatedly transmits response messages. An example of the first method is illustrated in FIG. 11. In each page message, the paging unit must indicate how many page hops remain before the paging unit will listen for a response. The number of remaining hops decrements for each additional page message. Preferably, the page message should also include the hop frequency on which the paging unit will listen. For example, in FIG. 11, page messages are sent repeatedly on hops 0 through 3. In each page message, the parameters (X,Y) are specified where X is the monitor hop, and Y is the number of hops left before the paging unit will listen for responses. In the first train, X=4 and Y decreases from 3 to 0. The standby unit receives the page message in hop 2. It waits for 1 hop and then transmits a response message in hop 5 as was indicated in the page message. This method increases the amount of data that must be sent in a paging message. In another method, the standby unit transmits the response message repeatedly on a single hop frequency. An example of such a method is illustrated in FIG. 12. After each page train, the paging unit listens on a hop for a response. The monitor hop frequency is different after each train. When the standby unit has received the paging message, it will return a response message using a hop frequency which corresponds to the hop in which the paging message was received. The response message is repeated for a fixed number of times, each time at the same frequency. For the sake of simplicity, in the example, the response hop is chosen equal to the successful page hop, hop number 1. To solve the recurrent problem of the paging unit now not knowing how long the standby unit will repeat its transmission after the paging unit has received the response in the second monitor event (in hop number 1), the response message could, for example, include an indication of how many response messages are left before the standby unit will listen again. This is similar to the method described in FIG. 11. In addition to the number of messages left, the hop number that the standby unit will listen in can be indicated.

Figure 13:
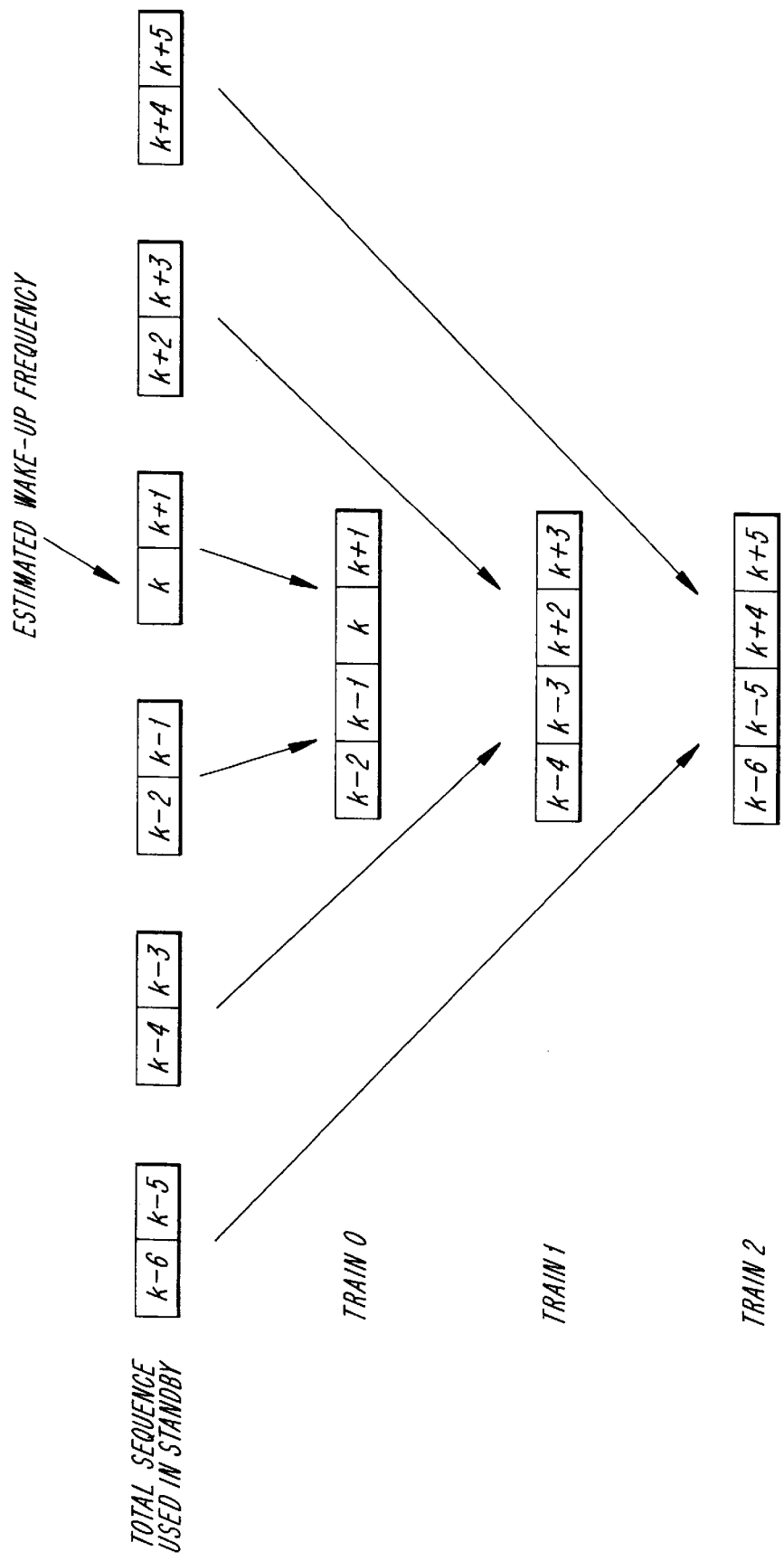
FIG. 13 and FIG. 14 are diagrams illustrating an example in which three optimized page trains are generated in accordance with an aspect of the invention.

Included in the discussion above is a description of a technique for generating page trains for use with the invention. The generation of page trains can be further optimized for those cases in which more than two page trains will be transmitted. The purpose of the optimization is to generate page trains that, when transmitted, are most likely to elicit an early response from the paged unit. FIG. 13 is a diagram illustrating a first example in which three optimized page trains are generated. In this example, the FH sequence has a length N=12, with the particular hop channels being designated k–6, k–5, ..., k, ..., k+4, k+5 (where k denotes the estimated wake-up frequency). It is further assumed that each train has a length M=4, so that a total of $N_T$=RNDUP(N/M)=3 trains will be required, here designated as trains 0, 1 and 2. Train 0 includes the hop channels {k–2, k–1, k, k+1}; train 1 includes the hop channels {k–4, k–3, k+2, k+3}; and train 2 includes the hop channels {k–6, k–5, k+4, k+5}. The principle behind the optimization is that the pager will first select a segment of the FH sequence that is close to the expected wake-frequency (i.e., hop channel k) by using train 0. If this does not work, it selects train 1, which has hop channels that are more remote from the expected frequency k. If this still does not work, the pager will then take train 2, which includes the remaining hop channels which are even more remote than those earlier tried. It will be noted that with this approach, the uncertainty in frequency is step-wise reduced (making use of prior knowledge), without affecting the wake-up time $T_{wake}$ (which is related to the length of a single train).

Figure 14:
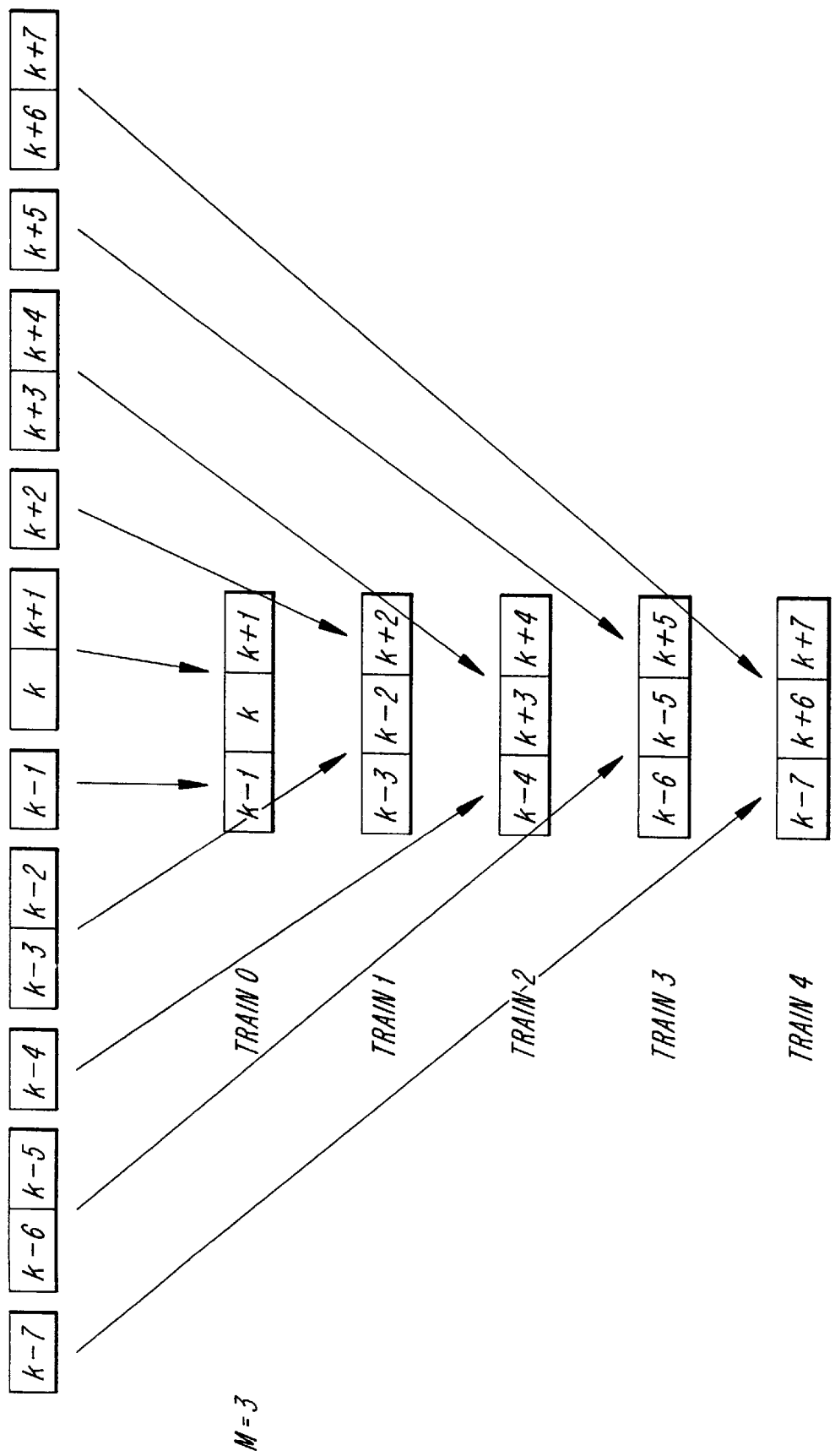

In the example illustrated by FIG. 13, M=4, which is an even number. FIG. 14 illustrates another example in which M is an odd number, namely, M=3. In this example, the FH sequence has a length N=15, with the particular hop channels being designated k−7, k−6, . . . , k, . . . , k+6, k+7 (where k denotes the estimated wake-up frequency). Because of the assumption that each train has a length M=3, a total of $N_T$=RNDUP(N/M)=5 trains will be required, here designated as trains 0, 1, 2, 3 and 4. Train 0 includes the hop channels {k−1, k, k+1}; train 1 includes the hop channels {k−3, k−2, k+2}; train 2 includes the hop channels {k−4, k+3, k+4}; train 3 includes the hop channels {k−6, k−5, k+5}; and train 4 includes the hop channels {k−7, k+6, k+7}. Again, the principle behind the optimization is that the pager will first select a segment of the FH sequence that is close to the expected wake-frequency (i.e., hop channel k) by using train 0. If this does not work, it selects train 1, which has hop channels that are more remote from the expected frequency k. If this still does not work, the pager will then take train 2, which includes the remaining hop channels which are even more remote than those earlier tried.

In general, then, the optimized page trains may be specified by a number of formulas. When the length, M, of each page train is even, the optimized page trains are specified by the following equation:

train $i=\{hop_{modN}(k_s'-(i+1)M/2), hop_{modN}(k_s'-(i+1)M/2+1), \ldots, hop_{modN}(k_s'-iM/2-1),$ $hop_{modN}(k_s'+iM/2), hop_{modN}(k_s'+iM/2+1), \ldots, hop_{modN}(k_s'+(i+1)M/2-1)\}$ where i=0, 1, 2, . . . $N_T$−1. FIG. 15a illustrates a generalized page train for the case where M is even.

When the length, M, of each page train is odd, an optimized page train may be defined by two formulas, one for the case in which the page train is an ith page train with i being an even number, and the other formula applying to the case in which the page train is an ith page train with i being an odd number. One exemplary set of formulas will now be presented. For the case in which an ith page train is to be constructed with i being an even number, the optimized page train may be specified by:

train $i=\{hop_{modN}(k_s'-iM/2-(M-1)/2), \ldots, hop_{modN}(k_s'-iM/2-1),$
$hop_{modN}(k_s'+iM/2), hop_{modN}(k_s'+iM/2+1), \ldots, hop_{modN}(k_s'+iM/2+(M-1)/2)\}$ where i is an even number within the range 0 . . . EVEN ($N_T$−1), where EVEN(x) represents a function that returns x when x is even, and returns a value x−1 when x is odd. FIG. 15b illustrates a generalized page train for the case where M is odd and i is even.

For the case in which the page train length, M, is an odd number and an ith page train is to be constructed with i being an odd number, the optimized page train may be specified by:

train $i=\{hop_{modN}(k_s'-iM/2-1/2-(M-1)/2), \ldots, hop_{modN}(k_s'-iM/2-3/2), hop_{modN}(k_s'-iM/2-1/2), hop_{modN}(k_s'+iM/2-1/2+1), \ldots,$
$hop_{modN}(k_s'+iM/2-1/2+(M-1)/2)\}$ where i is an odd number within the range 1 . . . ODD($N_T$−1), where ODD(x) represents a function that returns x when x is odd, and returns a value x−1 when x is even. FIG. 15c illustrates a generalized page train for the case where M is odd and i is even.

Referring back to FIG. 14, it can be seen that for the case of M=odd, the first page train (i.e., train 0) includes the expected wake-frequency (i.e., hop channel k) preceded and succeeded by hop frequencies that are respectively earlier and later than the expected wake-frequency. In particular, it will be observed that the first page train includes the same number of earlier hop frequencies as it has later hop frequencies. However, this is not possible for subsequent page trains because the length of each page train is odd. In the example of FIGS. 14, 15a and 15b, an arbitrary selection was made to follow the first page train with one that has more of the earlier hop frequencies than it has later hop frequencies. The next page train (i.e., train 2) has the opposite characteristic: there are more of the later hop frequencies than there are earlier hop frequencies. This pattern flip-flops back and forth until each of the page trains has been defined, thereby utilizing each of the possible hop frequencies in one of the page trains.

Those of ordinary skill in the art will recognize that the arbitrary decision to define train 1 with more of the earlier hop frequencies than of the later hop frequencies need not be made in all embodiments. To the contrary, alternative embodiments may define train 1 to have more of the later hop frequencies than of the earlier hop frequencies. In this case, a next page train (i.e., train 2) will have more of the earlier hop frequencies than later hop frequencies. This pattern will then continue to flip-flop until each of the hop frequencies has been defined. A person of ordinary skill will readily be able to make the modifications to the exemplary equations given above in order to derive the definitions for the odd and even page trains for use in the case in which the length, M, of the page train is odd.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the exemplary embodiment is applied to a system that utilizes frequency hopping. However, frequency hopping is merely one of a number of different types of channel hopping. The invention may be more generally applied to systems that use other types of channel hopping, such as the use of a code (spreading sequence) or any hopped entity that provides a channel, so long as it is not a time slot that is being hopped.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method for establishing a connection between a paging unit and a standby unit in a channel hopping communications system, the method comprising the steps of:

activating the standby unit for an activation time period, $T_{wake}$, out of every standby time period, $T_{standby}$;

during each activation time period, causing the standby unit to monitor a selected channel for receipt of a paging message, wherein the selected channel is selected from a plurality of channels, and wherein, for each subsequent activation time period, the selected channel is a subsequent one of the plurality of channels as specified by a hopping sequence;

during a first repetition period, repeatedly transmitting a first page train from the paging unit to the standby unit, until a response is received from the standby unit; and if the response is not received from the standby unit during the first repetition period, then during each of one or more subsequent repetition periods, repeatedly transmitting a corresponding one of one or more subsequent page trains from the paging unit to the standby unit until the response is received from the standby unit, wherein:

each of the first and subsequent page trains comprises a plurality of paging messages, each paging message being transmitted on a different one of a subset of the plurality of channels;

the first page train is transmitted on a subset of channels that are selected from the hopping sequence, wherein the selected channels include a hop frequency associated with an expected wake-frequency and one or more different hop frequencies that are nearest the expected wake-frequency in the hopping sequence, and wherein non-selected channels in the hopping sequence constitute one or more remaining portions of the hopping sequence; and each of the one or more subsequent page trains is transmitted on a respectively different subset of channels that are selected from those channels that are nearest the expected wake-frequency in successively remaining portions of the hopping sequence.

2. The method of claim 1, wherein the repetition period is substantially equal to the standby period.

3. The method of claim 1, wherein the repetition period is greater than or equal to the standby period.

4. The method of claim 1, wherein each page train is transmitted on a subset of channels that are selected from the plurality of channels in accordance with the following equation:

$$train\ i = \{hop_{modN}(k_s'-(i+1)M/2), hop_{modN}(k_s'-(i+1)M/2+1), \ldots, hop_{modN}(k_s'-iM/2-1)$$
$$hop_{modN}(k_s'+iM/2), hop_{modN}(k_s'+iM/2+1), \ldots, hop_{modN}(k_s'+(i+1)M/2-1)\}$$

where $k_s'$ is an estimate of a clock value of the standby unit, the standby unit's clock value being updated every $T_{standby}$ period, N is the number of channels in the hopping sequence, $T_{page}$ is the duration of a page message, $M=INT(T_{wake}/T_{page})-1$, where INT( ) is a function that leaves only the integer part of a variable, the number of page trains, $N_T$, is given by $N_T$=RNDUP (N/M), where RNDUP( ) is a function that rounds any non-integer up to the nearest integer, $i=0, \ldots, (N_T-1)$, and $hop_{modN}(x)=hop(x\ mod\ N)$.

5. The method of claim 4, wherein the estimate of the standby unit's clock is determined from a present clock value of a paging unit clock, adjusted by a previously determined offset between standby unit and paging unit clock values.

6. The method of claim 5, wherein the previously determined offset is stored in a non-volatile memory for future access attempts.

7. The method of claim 1, wherein each page train is transmitted on a subset of channels that are selected from the plurality of channels in accordance with the following equations:

$$train\ i = \{hop_{modN}(k_s'-iM/2-(M-1)/2), \ldots, hop_{modN}(k_s'-iM/2-1),$$
$$hop_{modN}(k_s'+iM/2), hop_{modN}(k_s'+iM/2+1), \ldots, hop_{modN}(k_s'+iM/2+(M-1)/2)\}$$

when i is an even number within the range 0 . . . EVEN $(N_T-1)$; and $$train\ i\{hop_{modN}(k_s'-iM/2-1/2-(M-1)/2), \ldots, hop_{modN}(k_s'-iM/2-3/2), hop_{modN}(k_s'-iM/2-1/2), hop_{modN}(k_s'+iM/2-1/2+1), \ldots, hop_{modN}(k_s'+iM/2-1/2+(M-1)/2)\}$$

when i is an odd number within the range 1 . . . ODD($N_T-1$), wherein:

EVEN(x) represents a first function that returns x when x is even, and returns a value x−1 when x is odd;

ODD(x) represents a second function that returns x when x is odd, and returns a value x−1 when x is even;

$k_s'$ is an estimate of a clock value of the standby unit, the standby unit's clock value being updated every $T_{standby}$ period;

N is the number of channels in the hopping sequence;

$T_{page}$ is the duration of a page message;

$M=INT(T_{wake}/T_{page})-1$, where INT( ) is a function that leaves only the integer part of a variable;

the number of page trains, $N_T$, is given by $N_T$=RNDUP (N/M), where RNDUP( ) is a function that rounds any non-integer up to the nearest integer;

and $hop_{modN}(x)=hop(x\ mod\ N)$.

8. The method of claim 7, wherein the estimate of the standby unit's clock is determined from a present clock value of a paging unit clock, adjusted by a previously determined offset between standby unit and paging unit clock values.

9. The method of claim 8, wherein the previously determined offset is stored in a non-volatile memory for future access attempts.

10. The method of claim 1, wherein the channel hopping communications system is a frequency hopping communications system.

11. The method of claim 1, wherein the channel hopping communications system is a code hopping communications system.

12. An apparatus for establishing a connection between a paging unit and a standby unit in a channel hopping communications system, the apparatus comprising:

means for activating the standby unit for an activation time period, $T_{wake}$, out of every standby time period, $T_{standby}$;

means for causing the standby unit to monitor a selected channel for receipt of a paging message during each activation time period, wherein the selected channel is selected from a plurality of channels, and wherein, for each subsequent activation time period, the selected channel is a subsequent one of the plurality of channels as specified by a hopping sequence;

means, operational during a first repetition period, for repeatedly transmitting a first page train from the paging unit to the standby unit, until a response is received from the standby unit; and means, responsive to the response not being received from the standby unit during the first repetition period, for repeatedly transmitting a corresponding one of one or more subsequent page trains from the paging unit to the standby unit during each of one or more subsequent repetition periods, until the response is received from the standby unit, wherein:
each of the first and subsequent page trains comprises a plurality of paging messages, each paging message being transmitted on a different one of a subset of the plurality of channels;
the first page train is transmitted on a subset of channels that are selected from the hopping sequence, wherein the selected channels include a hop frequency associated with an expected wake-frequency and one or more different hop frequencies that are nearest the expected wake-frequency in the hopping sequence, and wherein non-selected channels in the hopping sequence constitute one or more remaining portions of the hopping sequence; and
each of the one or more subsequent page trains is transmitted on a respectively different subset of channels that are selected from those channels that are nearest the expected wake-frequency in successively remaining portions of the hopping sequence.

13. The apparatus of claim 12, wherein the repetition period is substantially equal to the standby period.

14. The apparatus of claim 12, wherein the repetition period is greater than or equal to the standby period.

15. The apparatus of claim 12, wherein each page train is transmitted on a subset of channels that are selected from the plurality of channels in accordance with the following equation:

$$\text{train } i = \{hop_{modN}(k_s'-(i+1)M/2), hop_{modN}(k_s'-(i+1)M/2+1), \ldots, hop_{modN}(k_s'-iM/2-1) \; hop_{modN}(k_s'+iM/2), hop_{modN}(k_s'+iM/2+1), \ldots, hop_{modN}(k_s'+(i+1)M/2-1)\}$$

where
$k_s'$ is an estimate of a clock value of the standby unit, the standby unit's clock value being updated every $T_{standby}$ period,
N is the number of channels in the hopping sequence,
$T_{page}$ is the duration of a page message,
$M = INT(T_{wake}/T_{page}) - 1$, where INT( ) is a function that leaves only the integer part of a variable,
the number of page trains, $N_T$, is given by $N_T = RNDUP(N/M)$, where RNDUP( ) is a function that rounds any non-integer up to the nearest integer,
$i = 0, \ldots, (N_T - 1)$,
and $hop_{modN}(x) = hop(x \bmod N)$.

16. The apparatus of claim 15, further comprising means for determining the estimate of the standby unit's clock from a present clock value of a paging unit clock, adjusted by a previously determined offset between standby unit and paging unit clock values.

17. The apparatus of claim 16, further comprising a non-volatile memory for storing the previously determined offset for use in future access attempts.

18. The apparatus of claim 12, wherein each page train is transmitted on a subset of channels that are selected from the plurality of channels in accordance with the following equations:

$$\text{train } i = \{hop_{modN}(k_s'-iM/2-(M-1)/2), \ldots, hop_{modN}(k_s'-iM/2-1), hop_{modN}(k_s'+iM/2), hop_{modN}(k_s'+iM/2+1), \ldots, hop_{modN}(k_s'+iM/2+(M-1)/2)\}$$

when i is an even number within the range 1 ... EVEN($N_T-1$); and $$\text{train } i = \{hop_{modN}(k_s'-iM/2-1/2-(M-1)/2), \ldots, hop_{modN}(k_s'-iM/2-3/2), hop_{modN}(k_s'+iM/2-1/2),$$

$$hop_{modN}(k_s'+iM/2-1/2+1), \ldots, hop_{modN}(k_s'+iM/2-1/2+(M-1)/2)\}$$

when i is an odd number within the range 1 ... ODD($N_T-1$),
wherein:
EVEN(x) represents a first function that returns x when x is even, and returns a value x−1 when x is odd;
ODD(x) represents a second function that returns x when x is odd, and returns a value x−1 when x is even;
$k_s'$ is an estimate of a clock value of the standby unit, the standby unit's clock value being updated every $T_{standby}$ period;
N is the number of channels in the hopping sequence;
$T_{page}$ is the duration of a page message;
$M = INT(T_{wake}/T_{page}) - 1$, where INT( ) is a function that leaves only the integer part of a variable;
the number of page trains, $N_T$, is given by $N_T = RNDUP(N/M)$, where RNDUP( ) is a function that rounds any non-integer up to the nearest integer;
and $hop_{modN}(x) = hop(x \bmod N)$.

19. The apparatus of claim 18, further comprising means for determining the estimate of the standby unit's clock from a present clock value of a paging unit clock, adjusted by a previously determined offset between standby unit and paging unit clock values.

20. The apparatus of claim 19, further comprising a non-volatile memory for storing the previously determined offset for future access attempts.

21. The apparatus of claim 12, wherein the channel hopping communications system is a frequency hopping communications system.

22. The apparatus of claim 12, wherein the channel hopping communications system is a code hopping communications system.

* * * * *